United States Patent
Ollila et al.

(10) Patent No.: US 12,112,457 B2
(45) Date of Patent: Oct. 8, 2024

(54) SELECTIVE EXTENDED DEPTH-OF-FIELD CORRECTION FOR IMAGE RECONSTRUCTION

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 173 days.

(21) Appl. No.: 17/991,343

(22) Filed: Nov. 21, 2022

(65) Prior Publication Data
US 2024/0169492 A1    May 23, 2024

(51) Int. Cl.
| | |
|---|---|
| *G06T 5/73* | (2024.01) |
| *G06F 3/01* | (2006.01) |
| *G06T 5/50* | (2006.01) |
| *G06T 7/55* | (2017.01) |
| *G06T 15/20* | (2011.01) |
| *G06T 17/00* | (2006.01) |

(52) U.S. Cl.
CPC .............. *G06T 5/73* (2024.01); *G06F 3/013* (2013.01); *G06T 5/50* (2013.01); *G06T 7/55* (2017.01); *G06T 15/20* (2013.01); *G06T 17/00* (2013.01); *G06T 2207/20081* (2013.01); *G06T 2207/20084* (2013.01)

(58) Field of Classification Search
CPC ....................................................... G06T 5/73
See application file for complete search history.

(56) References Cited

U.S. PATENT DOCUMENTS

| | | | |
|---|---|---|---|
| 2013/0088489 A1* | 4/2013 | Schmeitz .................. G06T 5/20 |
| | | | 345/419 |
| 2019/0158803 A1* | 5/2019 | Mizukura ......... A61B 1/000095 |
| 2021/0373327 A1* | 12/2021 | Vlaskamp .......... G02B 27/0093 |

OTHER PUBLICATIONS

Lee et al, "Iterative Filter Adaptive Network for Single Image Defocus Deblurring", pp. 2034-2042, 2021, 9 pages.
Ruan et al, "AIFNet: All-in-Focus Image Restoration Network Using a Light Field-Based Dataset", IEEE Transactions on Computational Imaging, vol. 7, DOI: 10.1109/TCI2021.3092891, 2021, 14 pages.
Tan et al, :EDoF-ToF: extended depth of field time-of-flight imaging, Optics Express, vol. 29, No. 23, https://doi.org/10.1364/OE.441515, Nov. 8, 2021, 17 pages.

* cited by examiner

*Primary Examiner* — Shivang I Patel
(74) *Attorney, Agent, or Firm* — Ziegler IP Law Group LLC.

(57) ABSTRACT

A system including server(s) and data repository, wherein server(s) is/are configured to receive images of real-world environment captured using camera(s), corresponding depth maps, and at least one of: pose information, relative pose information; generate three-dimensional model (3D) of real-world environment; store 3D model; utilise 3D model to generate output image from perspective of new pose; determine whether extended depth-of-field (EDOF) correction is required to be applied to any one of: at least one of images captured by camera(s) representing given object(s), 3D model, output image, based on whether optical focus of camera(s) was adjusted according to optical depth of given object from given pose of camera; and when it is determined that EDOF correction is required to be applied, apply EDOF correction to at least portion of any one of: at least one of images captured by camera(s), 3D model, output image.

18 Claims, 3 Drawing Sheets

SELECTIVE EXTENDED DEPTH-OF-FIELD CORRECTION FOR IMAGE RECONSTRUCTION

TECHNICAL FIELD

The present disclosure relates to systems incorporating selective extended depth-of-field correction for image reconstruction. The present disclosure also relates to methods incorporating selective extended depth-of-field correction for image reconstruction.

BACKGROUND

In the recent decade, three-dimensional (3D) telepresence is actively being explored by researchers to bring the world closer. Such a 3D telepresence involves using evolving technologies such as immersive extended-reality (XR) technologies which makes an individual feel as if they are present at a location different from an existing location of the individual. With recent advancements in such technologies, demand for high-quality image generation has been increasing. Several advancements are being made to develop image generation techniques that facilitate generation of high-quality images using image reconstruction (namely, image resynthesis).

Recent advancements in machine learning have enabled in enhancing depth-of-field of two-dimensional (2D) images that are captured using a camera, which subsequently enhances implementation of the 3D telepresence. In particular, an optical blur caused by the camera for points lying outside a region of depth of focus of the camera are invertible if distance of each point to the camera is known. Herein, said points can be known when depth information is available using a stereo disparity analysis, Time-of-Flight (ToF) camera, light detection and ranging (LiDAR), or similar.

Despite recent progress in 3D telepresence, existing techniques and equipment for image generation have several limitations associated therewith. Firstly, the existing techniques are inadequate in terms of correcting images for image reconstruction by removing visual artifacts in the images, such as out-of-focus blurring. This is because existing techniques employ machine learning-based algorithms for correcting the images, by solving an inverse convolution function for an arbitrary optical system (for example, such as a lens system) of the camera. However, the inverse convolution function is not well-suited for removing said artifacts as said function has inherent limitations, such as electronic noise, temperature drift, variations within cameras used, and the like. Secondly, some neural network models (for example, such as deep learning neural network models) can be used to remove the visual artifacts in the images, but their implementation is computationally intensive and time consuming. Thus, the image reconstruction lacks a required resolution which is necessary for high-fidelity image reconstruction, as said models have limited capability in terms of representing realistic visual details of real-world environment. Therefore, the generated images are low quality and unrealistic, and are often generated with considerable latency/delay. This may, for example, lead to a poor, non-immersive viewing experience for a user.

Therefore, in light of the foregoing discussion, there exists a need to overcome the aforementioned drawbacks associated with existing equipment and techniques for image generation.

SUMMARY

The present disclosure seeks to provide a system incorporating selective extended depth-of-field correction for image reconstruction. The present disclosure also seeks to provide a method incorporating selective extended depth-of-field correction for image reconstruction. An aim of the present disclosure is to provide a solution that overcomes at least partially the problems encountered in prior art.

In a first aspect, the present disclosure provides a system comprising at least one server and a data repository communicably coupled to the at least one server, wherein the at least one server is configured to:
receive images of a real-world environment that are captured using at least one camera, corresponding depth maps, and at least one of:
pose information indicative of corresponding poses of the at least one camera from which the images and the depth maps are captured,
relative pose information indicative of a relative pose of a given camera with respect to a pose of at least one other given camera during capturing of the images, wherein the at least one camera comprises the given camera and the at least one other given camera;
process the images to generate a three-dimensional model of the real-world environment, based on the corresponding depth maps and the at least one of: the pose information, the relative pose information;
store the three-dimensional model of the real-world environment at the data repository;
utilise the three-dimensional model of the real-world environment to generate an output image from a perspective of a new pose, the output image representing at least one given object present in the real-world environment;
determine whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured; and
when it is determined that an extended depth-of-field correction is required to be applied, apply the extended depth-of-field correction to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object.

In a second aspect, the present disclosure provides a method comprising:
receiving images of a real-world environment that are captured using at least one camera, corresponding depth maps, and at least one of:
pose information indicative of corresponding poses of the at least one camera from which the images and the depth maps are captured,
relative pose information indicative of a relative pose of a given camera with respect to a pose of at least one other given camera during capturing of the images, wherein the at least one camera comprises the given camera and the at least one other given camera;

processing the images for generating a three-dimensional model of the real-world environment, based on the corresponding depth maps and the at least one of: the pose information, the relative pose information;

storing the three-dimensional model of the real-world environment at a data repository;

utilising the three-dimensional model of the real-world environment to generate an output image from a perspective of a new pose, the output image representing at least one given object present in the real-world environment;

determining whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured; and when it is determined that an extended depth-of-field correction is required to be applied, applying the extended depth-of-field correction to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object.

Embodiments of the present disclosure substantially eliminate or at least partially address the aforementioned problems in the prior art, and facilitate a simple, fast, accurate, and improved image reconstruction by selectively applying extended depth-of-field correction, thereby generating output images having high realism and high visual fidelity, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2A is a simplified version of an exemplary image of a real-world environment captured by a camera, while

Figure 1:
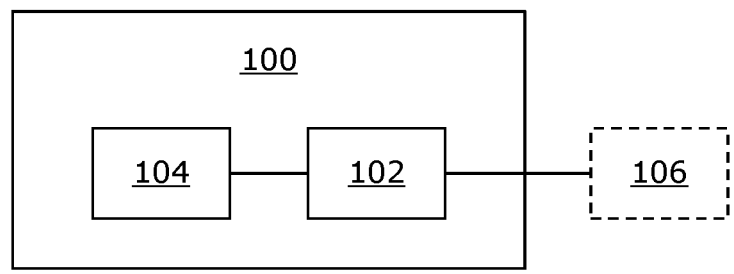
FIG. 1 illustrates a block diagram of a system incorporating selective extended depth-of-field correction for image reconstruction, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising at least one server and a data repository communicably coupled to the at least one server, wherein the at least one server is configured to:

receive images of a real-world environment that are captured using at least one camera, corresponding depth maps, and at least one of:

pose information indicative of corresponding poses of the at least one camera from which the images and the depth maps are captured, relative pose information indicative of a relative pose of a given camera with respect to a pose of at least one other given camera during capturing of the images, wherein the at least one camera comprises the given camera and the at least one other given camera;

process the images to generate a three-dimensional model of the real-world environment, based on the corresponding depth maps and the at least one of: the pose information, the relative pose information;

store the three-dimensional model of the real-world environment at the data repository;

utilise the three-dimensional model of the real-world environment to generate an output image from a perspective of a new pose, the output image representing at least one given object present in the real-world environment;

determine whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured; and when it is determined that an extended depth-of-field correction is required to be applied, apply the extended depth-of-field correction to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object.

In a second aspect, the present disclosure provides a method comprising:

receiving images of a real-world environment that are captured using at least one camera, corresponding depth maps, and at least one of:
pose information indicative of corresponding poses of the at least one camera from which the images and the depth maps are captured,
relative pose information indicative of a relative pose of a given camera with respect to a pose of at least one other given camera during capturing of the images, wherein the at least one camera comprises the given camera and the at least one other given camera;

processing the images for generating a three-dimensional model of the real-world environment, based on the corresponding depth maps and the at least one of: the pose information, the relative pose information;

storing the three-dimensional model of the real-world environment at a data repository;

utilising the three-dimensional model of the real-world environment to generate an output image from a perspective of a new pose, the output image representing at least one given object present in the real-world environment;

determining whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured; and when it is determined that an extended depth-of-field correction is required to be applied, applying the extended depth-of-field correction to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object.

The present disclosure provides the aforementioned system and the aforementioned method for facilitating a simple, fast, accurate, and improved image reconstruction by applying selective extended depth-of-field correction, thereby generating output images having high realism and high visual fidelity. Herein, the EDOF correction is selectively applied to at least a portion of any one of: the at least one of the images captured by the at least one camera, the 3D model, the output image. Output images (corresponding to different novel viewpoints/poses) generated using the corrected 3D model are of high quality and are realistic, and are generated in real time or near-real time (without any latency/delay), as compared to existing techniques for image reconstruction. This potentially leads to a realistic, immersive viewing experience for a user, when these output images are displayed to the user. The method and the system are simple, robust, fast, reliable, support real-time high-quality image reconstruction and can be implemented with ease.

In some implementations, the at least one server is implemented as a remote server. In such implementations, the remote server is separately located from the at least one camera. Moreover, the remote server receives the images from the at least one camera (or a device comprising the at least one camera), or from a data repository. As an example, the remote server could be a cloud server that provides a cloud computing service. Examples of the device include, but are not limited to, a head-mounted display device and a teleport device. In other implementations, the at least one server is implemented as a processor of a computing device. Examples of the computing device include, but are not limited to, a laptop, a desktop computer, a tablet, a phablet, a personal digital assistant, a workstation, and a console.

It will be appreciated that the term "at least one server" refers to "a single server" in some implementations, and to "a plurality of servers" in other implementations. When the system comprises the plurality of servers, different operations of the system can be performed by different (specially configured) servers from amongst the plurality of servers. As an example, a first server from amongst the plurality of servers may be configured to process the images for generating the three-dimensional (3D) model of the real-world environment, and a second server from amongst the plurality of servers may be configured to apply the extended depth-of-field (EDOF) correction.

It will be appreciated that the data repository could be implemented as a cloud-based memory, a memory of the at least one server, a memory of the computing device, a local memory of the at least one camera, a removable memory, or similar. Moreover, the data repository could store 3D environment models of different real-world environments. This allows the at least one server to serve different client devices.

Throughout the present disclosure, the term "camera" refers to an equipment that is operable to detect and process light signals received from the real-world environment, so as to capture the images of the real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Additionally, optionally, the at least one camera is implemented as a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared (IR) camera. It will be appreciated that the at least one camera is optionally implemented as a combination of the visible-light camera and the depth camera. Optionally, the at least one camera is communicably coupled to the at least one server. For example, the at least one camera may be communicably coupled to the at least one server using an ad-hoc network. The at least one server and the at least one camera could be at different regions (for example, different countries) or jurisdictions.

It will be appreciated that a given image is a visual representation of the real-world environment. The term "visual representation" encompasses colour information represented in the given image, and additionally optionally other attributes associated with the given image (for example, such as depth information, luminance information, transparency information, and the like). Optionally, the given image is a visible-light image. It will be appreciated that the given image captured by the at least one camera is received by the at least one server in real-time or near real-time (without any delay/latency).

Throughout the present disclosure, the term "depth map" refers to a data structure comprising information pertaining to optical depths of objects or their portions present in a given scene of the real-world environment. The depth map provides information pertaining to distances (namely, the optical depths) of surfaces of the objects or their portions, from a given viewpoint and a given viewing direction of the at least one camera. Optionally, the depth map is an image comprising a plurality of pixels, wherein a pixel value of each pixel indicates an optical depth of its corresponding real point/region within the given scene.

Optionally, the at least one server is configured to receive a given depth map corresponding to the given image from the depth-mapping means (or from a device comprising the at least one camera and the depth-mapping means). Optionally, a processor of the device is configured to process depth-mapping data collected by the depth-mapping means using at least one data processing algorithm, for generating the given depth map. The depth-mapping data may be in form of depth images, phase images, visible-light images, or similar. Correspondingly, requisite data processing algorithm(s) is/are employed to process the depth-mapping data. For sake of brevity, hereinafter, the term "depth-mapping data" is used interchangeably with a term "depth data".

In an embodiment, the depth-mapping means is implemented as a first camera and a second camera. In this regard, each of the first camera and the second camera could be implemented as the visible-light camera or as a combination of the visible-light camera and the depth camera. Alternatively, optionally, the depth-mapping means is implemented as at least one depth camera.

Optionally, when the depth-mapping means is implemented as the first camera and the second camera, wherein the first camera and the second camera are implemented as a first visible-light camera and a second visible-light camera, respectively, the processor of the device is configured to:
- control the first visible-light camera and the second visible-light camera to capture a first visible-light image and a second visible-light image, respectively; and
- process the first visible-light image and the second visible-light image to generate the depth map of the given scene of the real-world environment.

Optionally, in this regard, when processing the aforesaid images, pixels of the aforesaid images that represent a same 3D point or a same 3D region in the real-world environment are matched. Then, binocular disparities between the matched pixels of said images are determined. These binocular disparities are processed (for example, such as using a triangulation technique) to determine the optical depths for generating the given depth map.

It will be appreciated that the given depth map could also be generated using at least one of: depth from stereo, depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the depth map could also generated even without using the at least one depth camera. In this regard, the given depth map could be generated by using at least one of: a neural network model, a monocular depth estimation technique, a monochrome image. The monocular depth estimation technique may employ a single (monocular) RGB image for estimating depth values to generate the given depth map.

Furthermore, throughout the present disclosure, the term "pose" encompasses both a position and an orientation. Optionally, in this regard, pose-tracking means is employed to detect and/or follow a pose of the at least one camera from which a given image and a given depth map are captured. In such a case, the device optionally comprises the pose-tracking means, in addition to the at least one camera and/or the depth-mapping means. The pose tracking means may employ an outside-in tracking technique, an inside-out technique, or a combination of both the aforesaid techniques, for collecting pose-tracking data. Such techniques are well known in the art. The pose-tracking data may be in form of at least one of: images, Inertial Measurement Unit (IMU) values, Time-Inertial Measurement Unit (TIMU) values, motion sensor data values, magnetic field strength values. Optionally, the processor of the device is configured to: process the pose-tracking data to determine a given pose of the at least one camera from which the given image and the given depth map are captured; and send, to the at least one server, pose information indicative of the given pose of the at least one camera. Optionally, the processor is configured to employ at least one data processing algorithm to process the pose-tracking data. Examples of the at least one data processing algorithm include a feature detection algorithm, an environment mapping algorithm, and a pose data extrapolation algorithm.

It will be appreciated that the relative pose of the given camera with respect to the pose of the at least one other given camera is indicative of an offset between a pose of the given camera and a pose of the at least one other given camera. It will be appreciated that said relative pose could only be determined when both the given camera (or a given device comprising the given camera) and the at least one other given camera (or other given device comprising the at least one other given camera) are present in a same real-world environment. Optionally, in this regard, a processor of the other given device is configured to:
- project a first pattern of light onto the real-world environment by a first active illuminator of the other given device, whilst detecting reflections of the first pattern of light off the real-world environment by a first active sensor of the other given device, wherein said reflections are detected from a pose of the other given device;
- determine shapes of surfaces present in the real-world environment and distances of the surfaces from the pose of the other given device, based on the pattern and its detected reflections;
- obtain pattern information indicative of a second pattern of light projected onto the real-world environment by a second active illuminator of the given device;
- employ the first active sensor to detect reflections of the second pattern of light off the real-world environment, wherein the reflections of the second pattern are detected from the pose of the other given device; and
- determine a relative pose of the given device with respect to the pose of the other given device, based on the shapes and the distances of the surfaces, the second pattern and its detected reflections.

It will be appreciated that the relative pose of the given device with respect to the pose of the other given device corresponds to the relative pose of the given camera with respect to the pose of the at least one other given camera. A given pattern of light may be a structured-light pattern comprising a plurality of light spots. A manner in which the first pattern of light deforms upon striking the surfaces or their portions allows for determining the shapes of the surfaces or their portions and the distances of the surfaces or their portions from the pose of the other given device. The given pattern of light is deformed according to the shapes of the surfaces. The shape of a given surface could be cylindrical, spherical, conical, polygonal, freeform shape, and the like. The reflections of the second pattern of light are detected by the first active sensor of the other given device from only those surfaces (or their portions) in the real-world environment that are in fields of view of both the other given device and the given device. As the shapes and the distances of the surfaces are accurately known, it is possible to determine the relative pose of the given device (or the given camera) based on how the second pattern deformed upon striking the surfaces. The aforesaid offset (namely, the relative pose) could be determined by backtracking light rays of the reflections of the second pattern to the second active illuminator (namely, an origin of the second pattern) of the given device.

Throughout the present disclosure, the term "three-dimensional model" of the real-world environment refers to a data structure that comprises comprehensive information pertaining to a 3D space of the real-world environment. Such a comprehensive information is indicative of at least one of: surfaces or their portions present in the real-world environment, a plurality of features of objects or their portions present in the real-world environment, shapes and sizes of the objects or their portions, poses of the objects or their portions, materials of the objects or their portions, colour information of objects or their portions, light sources and lighting conditions within the surroundings. The object could be a living object (for example, such as a human, a pet, a plant, and the like) or a non-living object (for example, such as a wall, a window, a toy, a poster, a lamp, and the like). Examples of the plurality of features include, but are not limited to, edges, corners, blobs and ridges. Optionally, the 3D model is in a form of at least one of: a 3D polygonal mesh, a 3D point cloud, a 3D surface cloud, a 3D surflet cloud, a voxel-based model, a mathematical 3D surface model, a voxel-based model, a mathematical 3D surface model, a parametric model, a 3D grid, a 3D hierarchical grid, a bounding volume hierarchy. The 3D polygonal mesh could be a 3D triangular mesh or a 3D quadrilateral mesh. The mathematical 3D surface model may be based on a plane, a sphere, a cylinder, a box, or similar. For example, the mathematical 3D surface model may be a non-uniform rational basis spline (NURBS) model.

When the images are processed based on the corresponding depth maps, the at least one server utilizes the optical depths of the objects when generating the 3D model of the real-world environment. In such a case, the 3D model is accurately and comprehensively generated because information pertaining to the visual representation as well as the optical depths in the real-world environment is accurately known to the at least one server, in great detail from various perspectives of the at least one camera. Thus, the 3D model could further include information pertaining to placements, geometries, occlusions, and the like, of the objects or their portions from the various perspectives of the at least one camera. Additionally, optionally, when the images are processed based on the at least one of: the pose information, the relative pose information, the images are associated with the corresponding poses (namely, corresponding viewpoints) wherefrom the at least one camera has captured the images, to enable the at least one server for accurately determining the objects or their portions that are visible in the images from various perspectives of the corresponding poses. Beneficially, the 3D model generated in such a manner is accurate (for example, in terms of generating the output image from the perspective of the new pose), realistic, and is information-rich.

Optionally, when processing the images to generate the 3D environment model, the at least one server is configured to employ at least one data processing algorithm. Optionally, in this regard, the at least one data processing algorithm comprises at least one of: a feature extraction algorithm, an image stitching algorithm, an image merging algorithm, an interpolation algorithm, a 3D modelling algorithm, a photogrammetry algorithm, an image layering algorithm, an image blending algorithm. Such data processing algorithms are well-known in the art.

It will be appreciated that information indicative of the new pose could be received by the at least one server from a client device that is communicably coupled to the at least one server. The output image is a visual representation of the real-world environment that is generated from the perspective of the new pose using the 3D model. The client device could be a head-mounted display device or any other portable display device.

Optionally, when utilising the 3D model to generate the output image, the at least one server is configured to employ at least one data processing algorithm. Optionally, in this regard, the at least one data processing algorithm is employed to transform a 3D point in the 3D model to a 2D point in the output image, from the perspective of the new pose. The at least one data processing algorithm could be at least one of: an image synthesis algorithm (such as an RGB-D image synthesis algorithm), a view synthesis algorithm, a rendering algorithm. In an example implementation, when the 3D model is in the form of the 3D polygonal mesh, the image synthesis algorithm may be a triangle rasterization algorithm. In another example implementation, when the 3D environment model is in the form of the voxel-based model (such as a Truncated Signed Distance Field (TSDF) model), the image synthesis algorithm may be a ray marching algorithm. In yet another example implementation, when the 3D environment model is in the form of the 3D point cloud, the rendering algorithm may be a point cloud rendering algorithm, a point cloud splatting algorithm, an elliptical weighted-average surface splatting algorithm, and the like.

Throughout the present disclosure, the term "extended depth-of-field correction" refers to a corrective image processing operation that emulates a visual effect of extension of the depth-of-field over which the objects of the real-world environment appear to be in-focus (i.e., well focused) in an image. Herein, the term "depth-of-field" refers to a distance between a nearest point and a farthest point in the real-world environment that are acceptably sharply focused in the image captured by the at least one camera. A nearest point lies in front of a focus point (for example, such as an object) on which a lens of the at least one camera is actually focussed, while the farthest point lies behind the focus point. The nearest point and the farthest point may be an equal distance or at an unequal distance from the focus point. The depth-of-field may be determined based on at least one of:

a focal length of the lens of the at least one camera, a distance between the object and the at least one camera, a pixel size, an aperture size, a transmission characteristic of an aperture (i.e., in case of the at least one camera having multiple apertures). The extension of the depth-of-field does not sacrifice resolution or brightness, thereby clearly capturing the objects in the real-world environment without a need to adjust the focus of the at least one camera and an angle between the objects and the at least one camera. The extended depth-of-field (EDOF) correction enables deblurring of objects that lie outside of a focal region of the lens of the at least one camera (i.e., outside the depth-of-field of the lens of the camera) to produce an extended-in-focus view of the real-world environment. The EDOF correction may be applied to captured in-focus images of at least one of: multiple objects present in at least a foreground and/or a background of a given object in the real-world environment, oblique objects, objects at different heights, objects at different depths.

Optionally, the at least one camera has an adjustable optical focus. This means that the at least one camera is focusable i.e., a focal plane of at least one optical element (for example, a camera lens) of the at least one camera is adjustable. Such an adjustment facilitates in capturing sharp images of the real-world environment. It will be appreciated that when the optical focus of the at least one camera is adjusted according to the optical depth of the at least one given object, the at least one given object appears in-focus in the at least one of the images. By "adjusting according to the optical depth", it is meant that the at least one camera is adjusted for a focussing distance range in which the optical depth of the at least one given object lies. However, when the optical focus of the at least one camera is not adjusted according to the optical depth of the at least one given object, the optical depth of the at least one given object lies outside the focussing distance range of the at least one camera. In such a case, the at least one given object appears out-of-focus in the at least one of the images. Accordingly, the EDOF correction is applied to at least a portion of any one of: the at least one of the images, the 3D model, the output image. The EDOF correction could be applied to the 3D model as well because the 3D model is generated using the images having out-of-focus visual content. Beneficially, upon applying the EDOF correction, the at least one of the images and/or the output image appear realistic and highly accurate, as the at least one given object or at least the part of the at least one given object is acceptably sharp (i.e., well focused and clearly visible). Thus, an immersive and realistic viewing experience could be provided to a user viewing the output image. Moreover, upon applying the EDOF correction, the 3D model is highly accurate. Optionally, when the EDOF correction is applied to the 3D model, the 3D model stored at the data repository is updated by the at least one server. Adjustment of the optical focus of the at least one camera affects decision of whether the EDOF correction is required or not, as EDOF correction may or may not be required to be applied for different focal planes.

It will be appreciated that that the EDOF correction would be applied to more than one portion of any one of: the at least one of the images, the 3D model, the output image. For example, when the at least one given object is not selected based on user's gaze, the at least one server could selectively perform the EDOF correction on a given image representing objects that are out of focus and that lie in a central portion of a field of view of the given image. An angular width of such a central portion may, for example, lie in a range of 30 degrees to 60 degrees. Furthermore, it may not be necessary to apply the EDOF correction to an entirety of the at least one given object, but a particular part of the at least one given object, for example, on which the user's gaze is focussed.

Furthermore, optionally, the EDOF correction is applied by utilising at least one of: defocus map estimation, blind image deblurring deconvolution, non-blind image deblurring deconvolution. The defocus map estimation may utilize a defocussed (i.e., blurred) image to detect edges in said image, estimate an amount of blur around the edges, and interpolate the estimated amount of blur to determine the amount of blur in homogenous regions of the defocussed image. The blind image deblurring deconvolution may utilize a blur kernel that may be estimated based on a regularisation. The non-blind image deblurring deconvolution utilizes a point spread function (PSF) for image restoration. Thus, the EDOF correction may employ at least one of: a restoration filter based on deconvolving with a wiener filter, a constrained least-squares image restoration filter, a Lucy-Richardson deconvolution algorithm, an artificial neural network (ANN)-based image restoration algorithm. These techniques are well-known in the art.

The EDOF correction may be performed by employing a deblurring neural network implemented using deep learning techniques, to correct (i.e., deblur) at least the portion of any one of: the at least one of the images captured by the at least one camera, the 3D model, the output image, outside a focal region of a lens of the at least one camera. In such a case, an aperture of the at least one camera is large and thus allows more light to enter the lens of the at least one camera, as compared to cameras with smaller apertures. Herein, the neural network is utilized to extend the depth-of-field and increase light throughput as compared to conventional neural networks. Hence, signal-to-noise ratio is improved, thereby enabling a reduced consumption of power and overall improvement in accuracy of measurement. One such deblurring neural network using deep learning techniques is described, for example, in "*EDoF-ToF: extended depth of field time-of-flight imaging*" by Jasper Tan, Vivek Boominathan et al., published in Optics Express, Vol. 29, Issue 23, pp. 38540-38556, November 2021, which has been incorporated herein by reference.

Moreover, optionally, the at least one server is configured to:
- for a user viewing from the new pose, receive information indicative of gaze directions of the user's eyes;
- determine, based on the new pose and a convergence of the gaze directions, a gaze region in the real-world environment at which the user is gazing;
- select the at least one given object from amongst a plurality of objects present in the real-world environment, based on the gaze region.

In this regard, the at least one server is configured to receive, from gaze-tracking means, the information indicative of the gaze directions of the user's eyes. Optionally, the client device comprises the gaze-tracking means. The term "gaze-tracking means" refers to a specialized equipment for detecting and/or following gaze of the user's eyes. The term "gaze direction" refers to a direction in which the eyes of the user is gazing. The gaze direction may be indicated by a gaze vector in the aforesaid information. The gaze tracking means could be implemented as contact lenses with sensors, cameras monitoring a position, a size and/or a shape of a pupil of the user's eyes, and the like. Such gaze-tracking means are well-known in the art. It will be appreciated that the information indicative of the gaze directions of the user's eyes is received repeatedly from the gaze-tracking means throughout a given session of using the system, as gaze of the user's eye keeps changing.

The term "gaze region" refers to a gaze-contingent area in the real-world environment at which the gaze direction of the user is directed (namely, focussed). The gaze region may depend on accuracy of the gaze-tracking means as well as a size of a natural human gaze region for an optical depth at which the user is gazing. It will be appreciated that when user's gaze is directed (namely, focused) towards a point or a region within the real-world environment, a gaze direction of a first eye and a gaze direction of a second eye of the user are different from each other, and both the gaze directions will converge at said point or said region. The first eye is one of a left eye and a right eye of the user, while the second eye is another of the left eye and the right eye of the user. Since the new pose and the convergence of the gaze directions in the real-world environment are known, the at least server could easily and accurately determine the gaze region in the real-world environment. In this regard, objects or their portions that lie within the gaze region are focused onto foveae of the user's eyes, and are resolved by the user's eye to a much greater detail as compared to remaining objects from amongst the plurality of objects present in the real-world environment (i.e., objects that lie outside the gaze region). Objects or their portions that lie within the gaze region (namely, gaze-contingent objects) could be readily and accurately selected as the at least one given object by the at least one server. Beneficially, the user experiences high gaze-contingency and considerable realism upon viewing the output image upon the EDOF correction. In an example, a given image may represent a living room comprising a plurality of objects such as a sofa, five pillows, a chair, a lamp, and the like. Herein, the gaze region may include only one hand rest of the sofa, one pillow from amongst the five pillows, and the lamp.

Optionally, the at least one server is configured to determine whether there is at least one sub-region within the gaze region that is out-of-focus in the images captured by the at least one camera, wherein the at least one sub-region is determined to be out-of-focus when the optical depth of at least a part of the at least one given object present in the at least one sub-region from the given pose of the at least one camera lies outside a focussing distance range of a focus step that was used to capture the at least one of the images from the given pose of the at least one camera, wherein when there is at least one sub-region within the gaze region that is out-of-focus in the images captured by the at least one camera, it is determined that the EDOF correction is required to be applied, further wherein said portion to which the EDOF correction is applied represents at least the part of the at least one given object.

In this regard, when the optical depth of at least the part of the at least one given object present in the at least one sub-region lies outside the focussing distance range of the at least one camera, at least the part of the at least one given object is highly likely to appear blurred and out-of-focus in the at least one of the images. Hence, the at least one server determines the at least one sub-region within the gaze region that is out-of-focus in the at least one of the images for subsequent EDOF correction. A technical effect of determining the at least one sub-region within the gaze region is to adequately apply the EDOF correction to the at least one sub-region instead of an entirety of the gaze region, as the EDOF correction is computationally expensive and time consuming. The EDOF correction is applied in said portion which represents at least the part of the given object, so as to correct at least the colour information of the at least one the part of the given object. As a result, an overall visual quality of the at least one of the images improves.

Optionally, the focussing distance range of the at least one camera is divided into a plurality of focus steps. In such a case, the optical focus of the at least one camera is adjusted in a step-wise manner. The focussing distance range is a range of optical depths on which the at least one camera focuses within the real-world environment. It will be appreciated that different cameras have different focussing distance ranges for different focus steps. When a given focus step is employed for focussing the at least one camera, the optical focus of the at least one camera is adjusted to lie at a given optical depth. A total number of focus steps available for focusing are specific to a camera lens of the at least one camera. Typically, a number of focus steps is higher at smaller optical depths (namely, corresponding to nearby objects), as compared to larger optical depths (namely, corresponding to faraway objects). The number of focus steps could also be defined by a circle of confusion, as is known in the art.

In an example, there may be an exemplary image representing a garden in the real-world environment, wherein the image is captured using a given camera from a particular pose corresponding to a particular focus step for a focussing distance range of 10 centimetres (cm) to 40 cm. The image represents a flower A and a flower B in the garden. The gaze region may include the flower A. The sub-region within the gaze region may include a part of the flower A that is out-of-focus when an optical depth of the part of the flower A lies at 45 cm, which is outside the focussing distance range of the given camera. In such a case, the at least one server applies the EDOF correction to the sub-region.

Optionally, the extended depth-of-field correction is applied to at least one of: colour data, depth data, luminance data corresponding to said portion. Herein, the term "colour data" refers to colour information of said portion. Such a colour information could be in form of colour values of said pixels. Thus, the colour data could be in form of one of: Red-Green-Blue (RGB) values, Red-Green-Blue-Alpha (RGB-A) values, Red-Green-Blue-Depth (RGB-D) values, Cyan-Magenta-Yellow-Black (CMYK) values, Luminance and two-colour differences (YUV) values. The colour data could be in RAW format. In case of the depth data, the EDOF correction could be applied to a RAW phase image (namely, a mono image) captured by a ToF camera. Subsequently, the EDOF-corrected phase images are processed to generate depth images. As an example, the ToF camera may capture nine phase images, wherein the EDOF correction may then be applied to the nine phase images individually. These nine EDOF-corrected phase images may then be processed to generate a corresponding depth image. As another example, the EDOF correction may be applied to four phase images, which are then subsequently processed to generate a corresponding depth image.

Optionally, the term "luminance data" refers to a photometric measure of luminous intensity per unit area of light travelling in a given direction. Optionally, the EDOF correction is applied to the colour data or the luminance data. Beneficially, the EDOF correction is applied to the luminance data. For example, applying the EDOF correction to the luminance data, such as, luminance Y, may reduce bandwidth of transmission when compared to colour data (for example, such as RGB data).

Optionally, the at least one server is configured to store any one of: the at least one of the images, the 3D model of the real-world environment, the output image, at the data repository after applying the EDOF correction. In this regard, the at least one server is configured to replace original colour values of pixels in the portion of the at least one of the images with corrected colour values of said pixels in the portion, for storing any one of: the at least one of the images, the output image at the data repository. Herein, the aforementioned images and/or model is/are stored as historical data at the data repository. In such a case, when a new camera of a same type is employed, said historical data could be referred to determine what type corrections have been successful with a camera of the same type. In other words, the historical data enables to identify types of correction that could be applied to images captured by the new camera.

Optionally, the EDOF correction is applied by utilising a neural network that corrects point spread functions (PSFs) specific to at least one optical element of the at least one camera. The term "point spread function" refers to responses of at least one optical element of the at least one camera to any one of: a point source, a point object. Ideally, the PSF is a two-dimensional (2D) diffraction pattern of light that is formed when an infinitely small point-like light source is imaged through the at least one optical element (for example, a lens system) of the at least one camera. A shape of the PSF is affected by optical properties of the at least one optical element, a distance between the infinitely small point-like light source and the at least one optical element, and a location of said light source within a field-of-view of the at least one camera. However, in practice, PSFs often appear like a Gaussian function, due to at least one of: diffraction of light, aberration of the at least one optical element, image sensing. The at least one optical element could be a lens of the at least one camera. The PSFs are measure for the quality of the at least one camera, as they reveal how the at least one point is blurred in the image. Herein, integration of the PSFs over entire span of the PSFs is equal to 1, i.e., the PSFs are normalized. The PSFs allow for correction of out-of-focus blur in the image. If there is no out-of-focus blur, the PSFs are centred about zero. The out-of-focus blur causes the PSFs to move away from zero by an amount that is directly proportional to a shift in a pixel of the image. Typically, knowing the PSFs of the at least one camera is important for restoring sharpness of an original object with deconvolution in the image. The PSFs may be independent of a position in a plane of the object. The PSFs vary depending on a wavelength of the light. For example, shorter wavelengths of the light (for example, such as a blue light of 450 nanometres) result in PSFs that are smaller than PSFs of longer wavelengths of the light (for example, such as a red light of 650 nanometres). The PSF may further depend on a numerical aperture (NA) of the lens (i.e., an objective lens) of the at least one camera. In another example, an objective lens having a higher NA gives a smaller PSF when compared to an objective lens having a smaller NA. Moreover, the PSF may vary spatially across the lens. In other words, the PSF may vary across a field-of-view of the lens. This may be due to manufacturing tolerances of the lens which deteriorate the PSF towards edges of the lens. For example, a PSF for a point along an optical axis of the lens can be (slightly) different from a PSF for a point that is towards a periphery of the field-of-view of the lens. Thus, it is difficult to design a lens which projects a point to an image plane when moving from a centre of the lens towards an edge of the lens.

Optionally, the neural network that is used to correct the PSFs is a convolutional neural network. Optionally, in this regard, a U-Net architecture of the convolutional neural network is used to train the PSFs to procure correct PSFs. The U-Net architecture comprises a contracting path and an expansive path. The contracting path is similar to a typical structure of the convolutional neural network, wherein repeated application of convolution takes place, followed by a rectified linear unit and a max pooling operation. Herein, spatial information and feature information are fetched from the PSFs. Upon passing through the contracting path, the spatial information is reduced whereas the feature information is increased. Subsequently, the expansive path combines the spatial information and the feature information through a series of deconvolution and concatenations with high-resolution features procured from the contracting path. It will be appreciated that two different neural networks could also be utilised for correcting images corresponding to different eyes instead of utilising a single, large neural network, as is conventionally used. In such a case, computational processing is divided between the two different neural networks, thereby reducing time required in processing.

Optionally, the neural network is trained using at least one of:
  images having a specific type of blur or at least one specific focal plane,
  in-focus images as ground truth material and corresponding blurred images as training material,
along with corresponding depth information.

In this regard, the specific type of blur may be a defocus blur. As an example, such defocus blur could be in a form of a diffractive pattern (for example, in a shape of a disc with side lobes). As another example, such defocus blur could be in a form of a Gaussian blur. Optionally, the at least one server is configured to: receive, from a first device and a second device, the in-focus images captured by at least one first camera of the first device and the corresponding blurred images captured by at least one second camera of the second device along with the corresponding depth information, respectively, the at least one first camera having better at least one camera parameter as compared to the at least second camera; and train the neural network using the in-focus images as the ground truth material and the corresponding blurred images as the training material. In this regard, both the aforesaid devices are present within a same real-world environment. Moreover, the in-focus images captured by the at least one first camera has higher image quality (in terms of, for example, realism, sharpness, colour reproduction, and the like) as compared to the corresponding blurred images captured by the at least one second camera. Optionally, the at least one camera parameter is at least one of: a range of optical depths, a range of colours, an accuracy of autofocus (AF), a speed of AF, a scaling factor, a shutter speed, a lens aperture, a sensitivity, a pixel intensity, an accuracy of colour reproduction, a denoising factor, a lens distortion. Herein, the "ground truth material" refers to an ideal expected result. Such a result is better as compared to the training material but may not be perfect.

When the neural network is trained using the ground truth material and the training material, the neural network infers a function indicative of a difference between the ground truth material and the training material. This function is subsequently utilised by the (trained) neural network to generate a correction information for applying the EDOF correction as and when required. A deep learning framework such as a TensorFlow framework, a PyTorch framework, a Keras framework, a Caffe framework, or similar may be applied for training the neural network. The TensorFlow framework, the PyTorch framework, the Keras framework, an ONNX Runtime framework, or a CUDA framework may be applied for inference.

Optionally, a customised convolutional neural network is used to correct defocus blur in a given image. Herein, the customised neural network may employ defocus map estimation, non-blind deblurring deconvolution to resolve blind deblurring in the given image. The defocus map estimation is used to determine amount of blur at every pixel of the given image. The non-blind deblurring deconvolution is then used for converting the given image to a latent sharp image. One such customised convolutional neural network is described, for example, in "*AIFNet: All-in-Focus Image Restoration Network Using a Light Fields-Based Dataset*" by Lingyan Ruan, Bin Chen et al., published in IEEE Transactions on Computational Imaging, Vol. 7, pp. 675-688, 2021, which have been incorporated herein by reference. Optionally, an adaptive network is designed to correct a specific type of blur, such as a defocus blur. The defocus blur may be spatially-varying in nature and large in size. The adaptive network can generate at least one filter, wherein the at least one filter may be adaptive and spatially based on per pixel of a given image. Furthermore, the at least one filter are small as compared to conventional filters, and are separable. The at least one filter is then applied to features in the given image to correct the specific type of blur in the given image. The adaptive network may be trained on at least one specific function, wherein the at least one specific function is at least one of: defocus disparity estimation, reblurring. The defocus disparity estimation uses dual-pixel data to provide at least one stereo image. The disparities in the at least one stereo image is proportional to magnitude of the defocus blur. The reblurring uses the at least one filter to reblur ground truth all-in-focus image, which is then used to minimise difference between the given image and corresponding reblurred image. One such adaptive network is described, for example in, "*Iterative Filter Adaptive Network for Single Image Defocus Deblurring*" by Junyong Lee, Hyeongseok Son, et al. published in 2021 IEEE/CVF Conference on Computer Vision and Pattern Recognition (CVPR), pp. 2034-2042, 2021.

Optionally, the at least one server is configured to:
determine the optical depth of the at least one given object from the given pose of the at least one camera using which the at least one of the images representing the at least one given object was captured;
determine whether the optical depth of the at least one given object lies outside a focussing distance range of a focus step that was used to capture the at least one of the images from the given pose of the at least one camera;
when the optical depth of the at least one given object lies outside the focussing distance range of the focus step that was used, determine a different focussing step that corresponds to the optical depth of the at least one given object; and
select the neural network, from amongst a plurality of neural networks, based on the different focussing step that corresponds to the optical depth of the at least one given object.

In this regard, since information pertaining to the images, the corresponding depth maps, and the pose information are already and accurately known to the at least one server, the optical depth of the at least one given object could be easily determined by the at least one server. When the at least one given object lies outside the focussing distance range of the focus step, the at least one of the images does not represent a sharp view of the at least one given object. In other words, the at least one given object appears to be out-of-focus, i.e., blurred. Therefore, the different focussing step is determined so that the at least one given object in the at least one of the images appears sharper as compared to when a previous focussing step was used. When the different focussing step corresponds to the optical depth of the at least one given object, the at least one given object appears in-focus and free from any blur after EDOF correction. The at least one server selects the neural network corresponding to the different focussing step as different neural networks correspond to different focussing steps. Herein, said neural network is trained using images that are captured using respective ones of a plurality of focussing steps.

Optionally, the neural network may have been trained earlier (i.e., prior to the selection of the neural network) over a period of time, thereby leading to their learning of focusing characteristics of their corresponding focus steps based on the corresponding optical depths. Some neural networks may correspond to more than one focussing step. Examples of such neural networks include, but are not limited to, a Convolutional Neural Network (CNN), a generative adversarial network (GAN), a Recurrent neural network (RNN), an autoencoder, and encoders and decoders. Optionally, in this regard, a U-net architecture of the CNN can be used to train the neural network. The U-net architecture has features comprising one or more of: skip connections, a rectified linear unit (ReLU) activation function, at least one downscaling layer, at least one upscaling layer. The at least one downscaling layer and the at least one upscaling layer can be used for detecting both fine features and large features. The upscaling layer can also be used to increase dimensions of input provided to the CNN.

Optionally, the GANs typically work with image data and use Convolutional Neural Networks (CNNs) as generator and discriminator models. The generator and discriminator usually have deep convolutional layers to avoid difficulty in scaling of the neural network and to increase their capabilities by making them deeper. In an example, the neural network may be implemented as a Deep Convolutional Generative Adversarial Network (DCGAN). Other well-known examples of the GANs are Bicycle GAN and Cycle-GAN. The GANs are widely used nowadays for various deep learning-based applications (for example, such as to synthesize new images from existing images). Other examples of the neural network are convolutional autoencoders and variational autoencoders that can be used for manipulating (modifying) images as well as synthesize new images that are based on the content and style of at least two different images. These autoencoders include an encoder part and a decoder part. The neural network may be trained by the at least one server in cloud and may be a cloud-based neural network.

The present disclosure also relates to the method as described above. Various embodiments and variants disclosed above, with respect to the aforementioned system, apply mutatis mutandis to the method.

Optionally, the method further comprises:
for a user viewing from the new pose, receiving information indicative of gaze directions of the user's eyes;
determining, based on the new pose and a convergence of the gaze directions, a gaze region in the real-world environment at which the user is gazing;
selecting the at least one given object from amongst a plurality of objects present in the real-world environment, based on the gaze region.

Optionally, the method further comprises determining whether there is at least one sub-region within the gaze region that is out-of-focus in the images captured by the at least one camera, wherein the at least one sub-region is determined to be out-of-focus when an optical depth of at least a part of the at least one given object present in the at least one sub-region from the given pose of the at least one camera lies outside a focussing distance range of a focus step that was used to capture the at least one of the images from the given pose of the at least one camera, wherein when there is at least one sub-region within the gaze region that is out-of-focus in the images captured by the at least one camera, it is determined that the extended depth-of-field correction is required to be applied, further wherein said portion to which the extended depth-of-field correction is applied represents at least the part of the at least one given object.

Optionally, in the method, the extended depth-of-field correction is applied to at least one of: colour data, depth data, luminance data corresponding to said portion.

Optionally, the method further comprises storing any one of: the at least one of the images, the three-dimensional model of the real-world environment, the output image, at the data repository after applying the extended depth-of-field correction.

Optionally, in the method, the step of applying the extended depth-of-field correction comprises utilising a neural network that corrects point spread functions specific to at least one optical element of the at least one camera.

Optionally, in the method, the neural network is trained using at least one of:
  images having a specific type of blur or at least one specific focal plane,
  in-focus images as ground truth material and corresponding blurred images as training material,
along with corresponding depth information.

Optionally, the method further comprises:
    determining the optical depth of the at least one given object from the given pose of the at least one camera using which the at least one of the images representing the at least one given object was captured;
    determining whether the optical depth of the at least one given object lies outside a focussing distance range of a focus step that was used to capture the at least one of the images from the given pose of the at least one camera;
    when the optical depth of the at least one given object lies outside the focussing distance range of the focus step that was used, determining a different focussing step that corresponds to the optical depth of the at least one given object; and
    selecting the neural network, from amongst a plurality of neural networks, based on the different focussing step that corresponds to the optical depth of the at least one given object.

Optionally, in the method, the step of applying the extended depth-of-field correction comprises utilising at least one of: defocus map estimation, blind deblurring deconvolution, non-blind deblurring deconvolution.

DETAILED DESCRIPTION OF THE DRAWINGS

Referring to FIG. 1, illustrated is a block diagram of a system 100 incorporating selective extended depth-of-field correction for image reconstruction, in accordance with an embodiment of the present disclosure. The system 100 comprises at least one server (depicted as a server 102) and a data repository 104. The data repository 104 is communicably coupled to the server 102. Optionally, the server 102 is communicably coupled to at least one camera (depicted as a camera 106) or to a device comprising the at least one camera.

It may be understood by a person skilled in the art that FIG. 1 includes a simplified architecture of the system 100, for sake of clarity, which should not unduly limit the scope of the claims herein. It is to be understood that the specific implementation of the system 100 is provided as an example and is not to be construed as limiting it to specific numbers or types of servers, data repositories, and cameras. The person skilled in the art will recognize many variations, alternatives, and modifications of embodiments of the present disclosure.

Figure 2A:
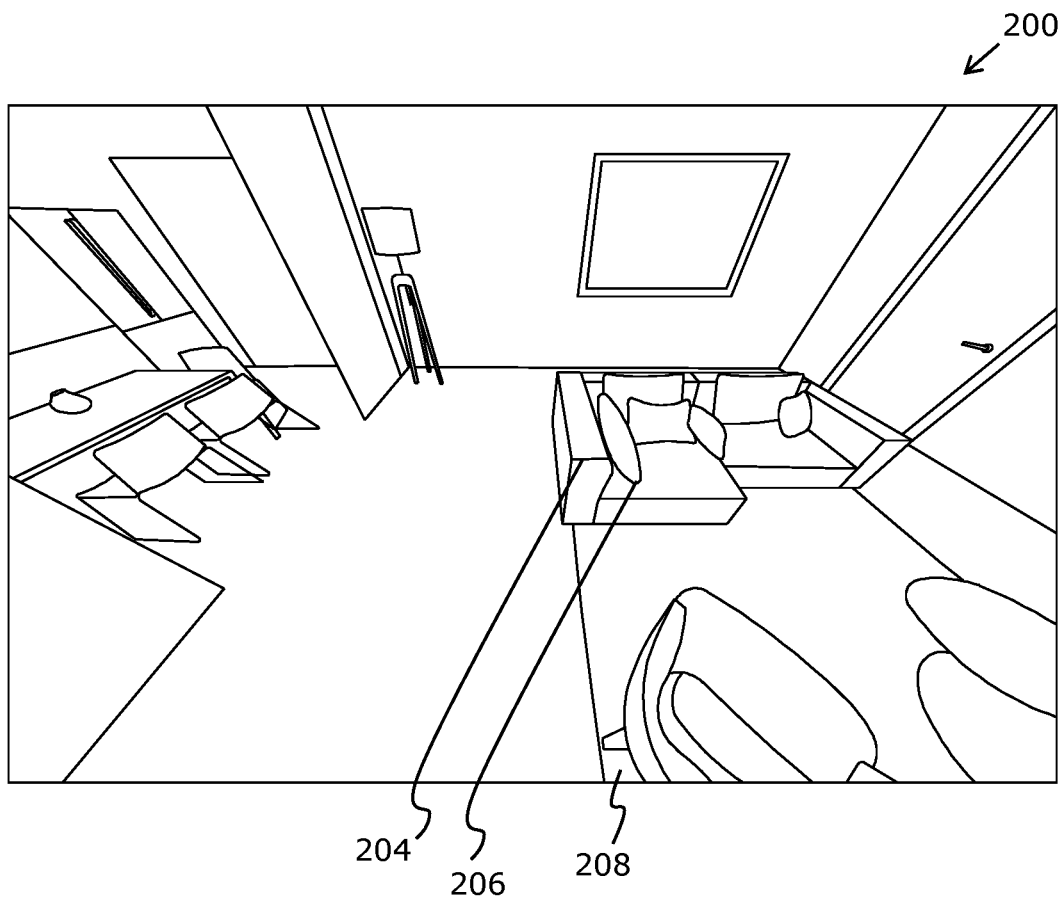
Figure 2B:
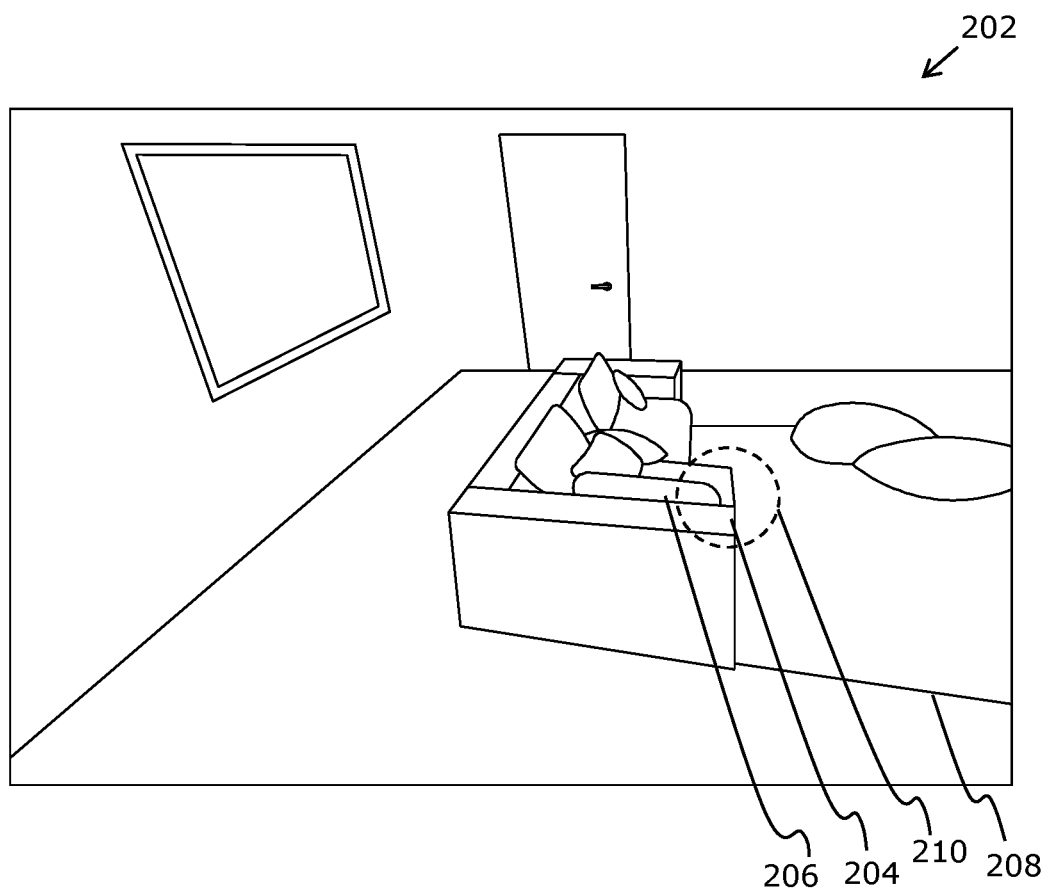
FIG. 2B is a simplified version of an exemplary output image that is generated by utilising a three-dimensional (3D) model of the real-world environment, in accordance with an embodiment of the present disclosure.

Referring to FIGS. 2A and 2B, FIG. 2A is a simplified version of an exemplary image 200 of a real-world environment captured by a camera, while FIG. 2B is a simplified version of an exemplary output image 202 that is generated by utilising a three-dimensional (3D) model of the real-world environment, in accordance with an embodiment of the present disclosure.

In FIG. 2A, the image 200 is captured by the camera from a particular pose of the camera. The image 200 represents a living room in the real-world environment, the living room comprising a plurality of objects, for example, such as, a sofa, a hand rest 204 of the sofa, a pillow 206, a carpet 208, a table, a chair, a lamp, a window, a wall, a door, a floor, and the like.

In FIG. 2B, the output image 202 is generated from a perspective of a new pose. The new pose is different as compared to a particular pose of the camera from which the image 200 is captured. As shown, the output image 202 represents some of the plurality of objects from the new pose. In an example, a gaze region 210 (depicted using a dotted circle) is determined in the output image 202, based on the new pose and a convergence of gaze directions of user's eyes.

FIGS. 2A and 2B are merely examples, which should not unduly limit the scope of the claims herein. A person skilled in the art will recognize many variations, alternatives, and modifications of embodiments of the present disclosure.

Figure 3:
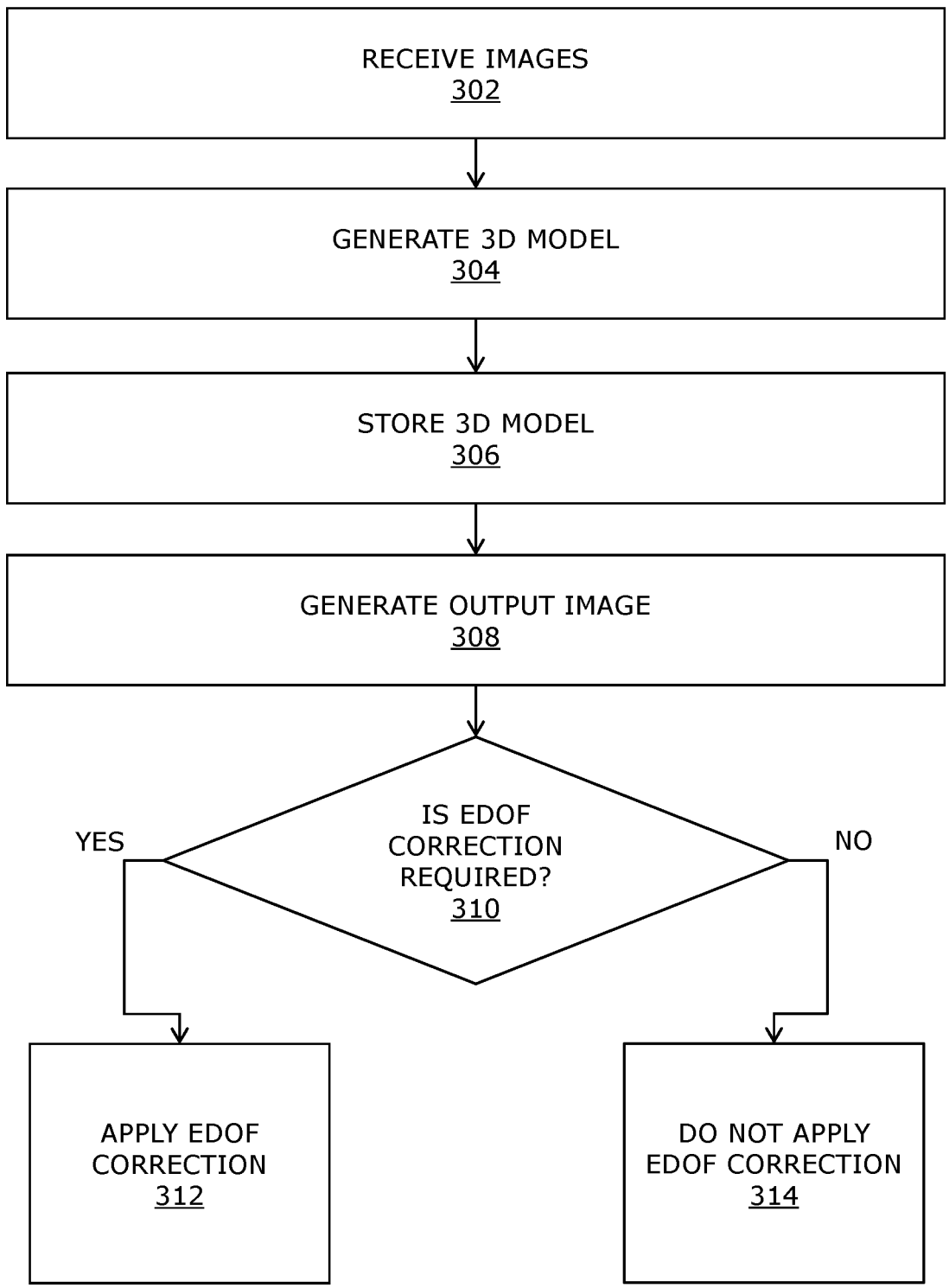
FIG. 3 illustrates steps of a method incorporating selective extended depth-of-field correction for image reconstruction, in accordance with an embodiment of the present disclosure.

Referring to FIG. 3, illustrated are steps of a method incorporating selective extended depth-of-field correction for image reconstruction, in accordance with an embodiment of the present disclosure. At step 302, images of a real-world environment that are captured using at least one camera are received, along with corresponding depth maps, and at least one of: pose information indicative of corresponding poses of the at least one camera from which the images and the depth maps are captured, relative pose information indicative of a relative pose of a given camera with respect to a pose of at least one other given camera during capturing of the images, wherein the at least one camera comprises the given camera and the at least one other given camera. At step 304, the images are processed to generate a three-dimensional model of the real-world environment, based on the corresponding depth maps and the at least one of: the pose information, the relative pose information. At step 306, the three-dimensional model of the real-world environment is stored at the data repository. At step 308, the three-dimensional model of the real-world environment is utilised to generate an output image from a perspective of a new pose, the output image representing at least one given object present in the real-world environment. At step 310, it is determined whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured. When it is determined that an extended depth-of-field correction is required to be applied, at step 312, the extended depth-of-field correction is applied to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object. Otherwise, when it is determined that an extended depth-of-field correction is not required to be applied, at step 314, the extended depth-of-field correction is not applied. After performing any of the steps 312 or 314, the 3D model of the real-world environment is utilised to generate further output images from a perspective of other new poses, and the aforementioned steps are repeated.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising at least one server and a data repository communicably coupled to the at least one server, wherein the at least one server is configured to:
   receive images of a real-world environment that are captured using at least one camera, corresponding depth maps, and at least one of:
     pose information indicative of corresponding poses of the at least one camera from which the images and the depth maps are captured,
     relative pose information indicative of a relative pose of a given camera with respect to a pose of at least one other given camera during capturing of the images, wherein the at least one camera comprises the given camera and the at least one other given camera;
   process the images to generate a three-dimensional model of the real-world environment, based on the corresponding depth maps and the at least one of: the pose information, the relative pose information;
   store the three-dimensional model of the real-world environment at the data repository;
   utilise the three-dimensional model of the real-world environment to generate an output image from a perspective of a new pose, the output image representing at least one given object present in the real-world environment;
   determine whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured; and
   when it is determined that an extended depth-of-field correction is required to be applied, apply the extended depth-of-field correction to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object.

2. The system of claim 1, wherein the at least one server is configured to:
   for a user viewing from the new pose, receive information indicative of gaze directions of the user's eyes;
   determine, based on the new pose and a convergence of the gaze directions, a gaze region in the real-world environment at which the user is gazing;
   select the at least one given object from amongst a plurality of objects present in the real-world environment, based on the gaze region.

3. The system of claim 2, wherein the at least one server is configured to determine whether there is at least one sub-region within the gaze region that is out-of-focus in the images captured by the at least one camera, wherein the at least one sub-region is determined to be out-of-focus when an optical depth of at least a part of the at least one given object present in the at least one sub-region from the given pose of the at least one camera lies outside a focussing distance range of a focus step that was used to capture the at least one of the images from the given pose of the at least one camera,
   wherein when there is at least one sub-region within the gaze region that is out-of-focus in the images captured by the at least one camera, it is determined that the extended depth-of-field correction is required to be applied,
   further wherein said portion to which the extended depth-of-field correction is applied represents at least the part of the at least one given object.

4. The system of claim 1, wherein the extended depth-of-field correction is applied to at least one of: colour data, depth data, luminance data corresponding to said portion.

5. The system of claim 1, wherein the at least one server is configured to store any one of: the at least one of the images, the three-dimensional model of the real-world environment, the output image, at the data repository after applying the extended depth-of-field correction.

6. The system of claim 1, wherein the extended depth-of-field correction is applied by utilising a neural network that corrects point spread functions specific to at least one optical element of the at least one camera.

7. The system of claim 6, wherein the neural network is trained using at least one of:
   images having a specific type of blur or at least one specific focal plane,
   in-focus images as ground truth material and corresponding blurred images as training material,
   along with corresponding depth information.

8. The system of claim 6, wherein the at least one server is configured to:
- determine the optical depth of the at least one given object from the given pose of the at least one camera using which the at least one of the images representing the at least one given object was captured;
- determine whether the optical depth of the at least one given object lies outside a focussing distance range of a focus step that was used to capture the at least one of the images from the given pose of the at least one camera;
- when the optical depth of the at least one given object lies outside the focussing distance range of the focus step that was used, determine a different focussing step that corresponds to the optical depth of the at least one given object; and
- select the neural network, from amongst a plurality of neural networks, based on the different focussing step that corresponds to the optical depth of the at least one given object.

9. The system of claim 1, wherein the extended depth-of-field correction is applied by utilising at least one of: defocus map estimation, blind deblurring deconvolution, non-blind deblurring deconvolution.

10. A method comprising:
- receiving images of a real-world environment that are captured using at least one camera, corresponding depth maps, and at least one of:
  - pose information indicative of corresponding poses of the at least one camera from which the images and the depth maps are captured,
  - relative pose information indicative of a relative pose of a given camera with respect to a pose of at least one other given camera during capturing of the images, wherein the at least one camera comprises the given camera and the at least one other given camera;
- processing the images for generating a three-dimensional model of the real-world environment, based on the corresponding depth maps and the at least one of: the pose information, the relative pose information;
- storing the three-dimensional model of the real-world environment at a data repository;
- utilising the three-dimensional model of the real-world environment to generate an output image from a perspective of a new pose, the output image representing at least one given object present in the real-world environment;
- determining whether an extended depth-of-field correction is required to be applied to any one of: at least one of the images captured by the at least one camera representing the at least one given object, the three-dimensional model of the real-world environment, the output image, based on whether an optical focus of the at least one camera was adjusted for capturing the at least one of the images according to an optical depth of the at least one given object from a given pose of the at least one camera from which the at least one of the images was captured; and
- when it is determined that an extended depth-of-field correction is required to be applied, applying the extended depth-of-field correction to at least a portion of any one of: the at least one of the images captured by the at least one camera, the three-dimensional model of the real-world environment, the output image, wherein said portion to which the extended depth-of-field correction is applied represents the at least one given object or at least a part of the at least one given object.

11. The method of claim 10, further comprising:
- for a user viewing from the new pose, receiving information indicative of gaze directions of the user's eyes;
- determining, based on the new pose and a convergence of the gaze directions, a gaze region in the real-world environment at which the user is gazing;
- selecting the at least one given object from amongst a plurality of objects present in the real-world environment, based on the gaze region.

12. The method of claim 11, further comprising determining whether there is at least one sub-region within the gaze region that is out-of-focus in the images captured by the at least one camera, wherein the at least one sub-region is determined to be out-of-focus when an optical depth of at least a part of the at least one given object present in the at least one sub-region from the given pose of the at least one camera lies outside a focussing distance range of a focus step that was used to capture the at least one of the images from the given pose of the at least one camera,
- wherein when there is at least one sub-region within the gaze region that is out-of-focus in the images captured by the at least one camera, it is determined that the extended depth-of-field correction is required to be applied,
- further wherein said portion to which the extended depth-of-field correction is applied represents at least the part of the at least one given object.

13. The method of claim 10, wherein the extended depth-of-field correction is applied to at least one of: colour data, depth data, luminance data corresponding to said portion.

14. The method of claim 10, further comprising storing any one of: the at least one of the images, the three-dimensional model of the real-world environment, the output image, at the data repository after applying the extended depth-of-field correction.

15. The method of claim 10, wherein the step of applying the extended depth-of-field correction comprises utilising a neural network that corrects point spread functions specific to at least one optical element of the at least one camera.

16. The method of claim 15, wherein the neural network is trained using at least one of:
- images having a specific type of blur or at least one specific focal plane,
- in-focus images as ground truth material and corresponding blurred images as training material, along with corresponding depth information.

17. The method of claim 15, further comprising:
- determining the optical depth of the at least one given object from the given pose of the at least one camera using which the at least one of the images representing the at least one given object was captured;
- determining whether the optical depth of the at least one given object lies outside a focussing distance range of a focus step that was used to capture the at least one of the images from the given pose of the at least one camera;
- when the optical depth of the at least one given object lies outside the focussing distance range of the focus step that was used, determining a different focussing step that corresponds to the optical depth of the at least one given object; and selecting the neural network, from amongst a plurality of neural networks, based on the different focussing step that corresponds to the optical depth of the at least one given object.

18. The method of claim 10, wherein the step of applying the extended depth-of-field correction comprises utilising at least one of: defocus map estimation, blind deblurring deconvolution, non-blind deblurring deconvolution.

\* \* \* \* \*